US008230061B2

(12) United States Patent
Hassan et al.

(10) Patent No.: US 8,230,061 B2
(45) Date of Patent: Jul. 24, 2012

(54) NETWORK RESOURCE MANAGEMENT WITH PREDICTION

(75) Inventors: Amer A. Hassan, Kirkland, WA (US);
Billy R. Anders, Jr., Bothell, WA (US);
PehKeong Teh, Redmond, WA (US);
Andrew T. Baron, Redmond, WA (US);
Shai Guday, Remond, WA (US);
Upshur W. Parks, Bothell, WA (US);
Marco Piumatti, Woodinville, WA (US);
Dmitry A. Anipko, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/726,209

(22) Filed: Mar. 17, 2010

(65) Prior Publication Data

US 2011/0231551 A1 Sep. 22, 2011

(51) Int. Cl.
*G06F 15/173* (2006.01)
(52) U.S. Cl. ........................................................ 709/224
(58) Field of Classification Search ........... 709/223–229
See application file for complete search history.

(56) References Cited

U.S. PATENT DOCUMENTS

| 6,578,077 | B1 | 6/2003 | Rakoshitz |
| 6,848,004 | B1 | 1/2005 | Chang |
| 7,096,263 | B2 | 8/2006 | Leighton |
| 7,263,095 | B1 * | 8/2007 | Sarkar ........................ 370/352 |
| 7,412,516 | B1 | 8/2008 | Brown |
| 7,844,441 | B2 * | 11/2010 | Grabarnik et al. .............. 703/21 |
| 2002/0188732 | A1 | 12/2002 | Buckman |
| 2005/0044260 | A1 | 2/2005 | Abramson |
| 2010/0017506 | A1 * | 1/2010 | Fadell ........................... 709/224 |
| 2010/0191846 | A1 * | 7/2010 | Raleigh ......................... 709/224 |
| 2010/0317420 | A1 * | 12/2010 | Hoffberg ........................ 463/1 |
| 2011/0096762 | A1 * | 4/2011 | Basart .......................... 370/338 |

OTHER PUBLICATIONS

BreadCrumbs: Forecasting Mobile Connectivity, published Sep. 29, 2008, http://www.eecs.umich.edu/~tonynich/mobicom08.pdf.
QoS Driven Parallelization of Resources to Reduce File Download Delay, published Oct. 2006, http://ieeexplore.ieee.org/stamp/stamp.jsp?arnumber=1687888.

* cited by examiner

*Primary Examiner* — Larry Donaghue
(74) *Attorney, Agent, or Firm* — Wolf, Greenfield & Sacks, P.C.

(57) ABSTRACT

A computing device including an indicator predicting use of a network resource. The indicator may provide an indication that a threshold associated with a budget for the network resource has or will be reached. When a user requests a network operation that will consume the network resource, an amount of the network resource to be consumed by the operation is predicted, if possible. If the prior use of the network resource and the amount to be used to complete the network operation exceeds a threshold the user may be warned and given an opportunity to cancel the operation or adjust the way in which the operation will be performed. If the amount of network resource a network operation will consume is unknown, a rate of use of the network resource is determined and a time until the budget is reached is estimated. An administrative tool is provided for managing network resources and setting budgets for resource consumption by users, devices, or applications.

19 Claims, 12 Drawing Sheets

NETWORK RESOURCE MANAGEMENT WITH PREDICTION

BACKGROUND

Computing devices can provide network connectivity using a number of different wired and wireless technologies. The networks to which devices connect are sometimes provided as a subscription-based service for which a consumer pays. Familiar examples of network services are wireline telephone services, wireless phone voice and data services, Internet services, and television services. While the service plans that network service providers offer vary widely in terms and structure, many service plans are based on providing a limited amount of access to a network resource at a fixed cost. If a user exceeds the usage limit the network service provider usually charges the customer for each additional increment of use. For example, a wireless phone plan may permit a certain number of voice minutes and a certain amount of data be transferred for the customer during a month. When a customer exceeds the usage limit for voice minutes, the network service provider may charge the customer for each minute over the limit. Similar overage charges may be imposed for data transfers once the data usage limit is exceeded.

SUMMARY

The inventors have recognized and appreciated that the complexity associated with the manner in which network services are used makes it difficult for users of network services to anticipate when service limits will be reached or exceeded. Consequently, users may be faced with unexpected costs incurred due to exceeding a usage limit of a network resource associated with a network service. Without feedback, it can be difficult for the user to predict whether the usage limit has been exceeded, particularly if the user shares the network resource with other users or if the network resource is accessed from multiple devices or by multiple applications.

A tool may be provided for managing network resources by budgeting use of the network resource across users, devices, and applications. As one example, a user device may be configured to provide an indicator showing the user that usage of the network resource is approaching, has reached or exceeded a budgeted limit. The user, now knowing the usage of the network resource, may be afforded the opportunity to adjust use of the network resource accordingly. Budgets may be set for one or more entities acting as network resource consumers that may share a network subscription. The entities, for example, may be users, devices or applications.

In some embodiments, an indicator is output from a user device when an amount of the network resource used approaches the usage limit. For example, a threshold may be set as a percentage of the usage limit, for example, 90% of the usage limit. When the threshold is met or exceeded, the indicator is output.

In some embodiments, when a consumer of network resources initiates an operation that would consume a network resource, a prediction is made of how much of the network resource the operation will consume. If the operation involves transfer over the network of content that is of a known size, an indicator may be output on the user device if completing the operation results in exceeding a usage threshold. If the content is of unknown size, an indicator may be output indicating how long the operation may continue before the usage limit is reached. The system may control whether use of the network resource is stopped or allowed to continue once the usage limit of the network resource has been reached.

Some aspects relate to managing a set of one or more network services for a group of one or more users. An administrative tool may allow an administrator of the group to view network resource usage and set policy related to resource usage for the group of user. For example, the administrator may set a budget for each user of a shared network resource. A user's budget may guarantee the user access to a portion of the network resource or may simply limit the user's access provided the overall usage limit of the resource is not exceeded. In some embodiments, a guaranteed budget and a shared budget is defined for each user in a group that shares a network resource.

In some embodiments the administrative tool allows the user to review each user in the group's use of the set of network services. The administrative tool may further permit review of network resources per device and/or per application. Budgets may be set for devices and applications across user or per user.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that the user experience of networked computers can be improved by allowing users of a network service to control and monitor their usage of a network resource. For example, a user may monitor her use of the network resource to avoid exceeding a usage limit of the network resource. Once a user's consumption of the network resource exceeds the usage limit, a service plan may deny access to the network service or require the user to pay for additional access. As current systems place a large burden on users to assess their usage of the network, a user may be unaware that she is approaching or has exceeded the usage limit set by her service plan. The inventors have recognized and appreciated that use of network resources may be managed by setting resource use budgets for users, devices, and/or applications. The budgets may be used to control an indicator that may be output on a user device if the user is approaching, reached or has exceeded a budgeted limit. In this way users of a shared or unshared network resource are given the opportunity to make a decision regarding further usage of the network resource.

In conjunction with specifying budgets, actions upon reaching or exceeding thresholds defined as part of the budget may also be defined. These actions may include warning a user of an approaching limit, switching to a lower bandwidth connection or blocking access to a network service. These actions may be taken automatically by a component of a computer system that manages connections to networks or other suitable component within a networked computing device.

To facilitate setting of budgets, an administrative tool is provided that allows an administrator of the group of users to review usage of network resources by the group of users and set budgets for users, devices and applications as desired. The budgets may provide guaranteed and/or maximum limits of a network resource that a user, device, or application may consume.

Figure 1:
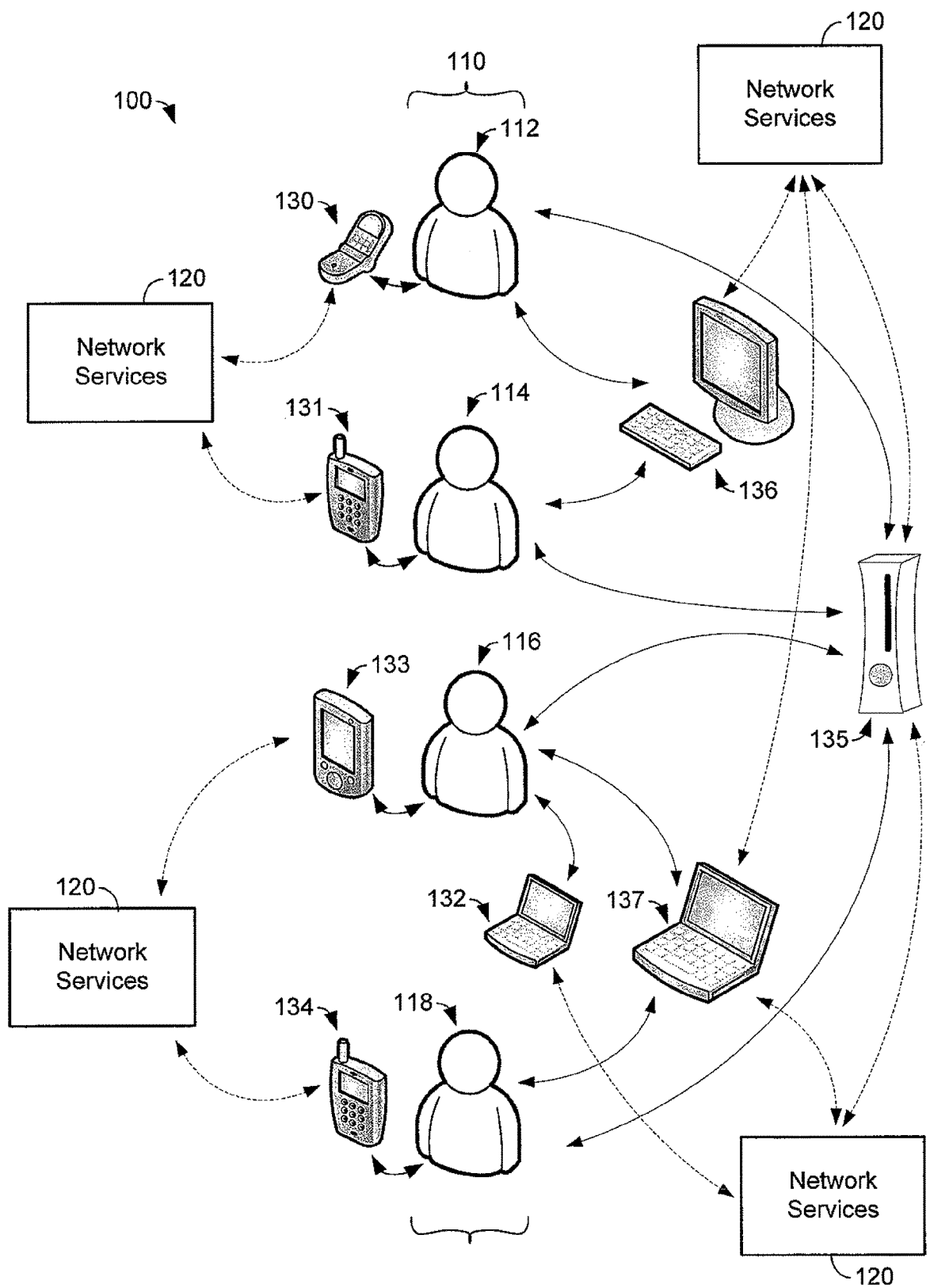
FIG. 1 shows a exemplary usage scenario according to some embodiments.

FIG. 1 is a diagram illustrating an exemplary usage scenario 100. Usage scenario 100 includes a group of users 110 that may use user devices 130-137 to access network services 120. In FIG. 1, users and devices are related by solid double arrowed lines, and devices and services are related by dashed double arrowed line. These relationships are merely examples, and any suitable relationship may exist between users devices and network services.

Network services 120 may include any type of network service that may be provided over a wired and/or wireless network. Network services may include, for example and not limitation, wireline telephone services, wireless telephone services, wireless data services, wired and wireless Internet access services, and wired and wireless television and radio services. Though, network services 120 may include any information service that may be delivered through wired or wireless communications. Each network service may be provided by a respective network service provider. A user or a group of users may have a relationship with the network service provider that allows the user or group to access the network service. The relationship may be defined by a service plan.

Each of users 110 may be associated with certain user devices such that usage of network services 120 by the device may be assigned to a particular user. Some computing devices may be exclusively or predominantly associated with a single user. For example, cellular phone 130 is used predominantly by user 112, smart phone 131 is used predominantly by user 114, netbook 132 and PDA 133 are used predominantly by user 116, and smart phone 134 is used predominantly by user 118. Though different users have different individual devices, multiple users may share a subscription such that network operations performed by any device that share the subscription may count towards any limits of the subscription.

Some devices may be shared by multiple users. If a network subscription is accessed through such a shared device, usage bay any of the users may count towards any limits of the subscription. For example, users 112 and 114 may share computer 136, users 116 and 118 may share computer 137, and the group of users 110 may each use console 135. In some embodiments, user accounts may be established on devices so that use of a network resource may be associated with a specific user. Users may also be associated implicitly with use of a network resource. For example, use may be assigned to the predominant user of a device. Though, network resource use may be associated with a user in any suitable way.

In addition to associating use of a network resource with a particular user, network resource usage may also be associated with and individually limited for particular applications. In this way use of the network resource is effectively shared such that network usage by frivolous applications may be limited or prevented.

In some embodiments, one or more of the users in the group of users 110 is an administrator of the group. One or more of the user devices may provide an administrative tool for the administrator to monitor and control access to the network services. Though, use of the network services may be monitored and controlled in any suitable way. In some embodiments, for example, the devices may report network resource usage to the administrative tool.

The users, devices, services, and the interrelationships shown in usage scenario 100 are purely exemplary. Any suitable number or users, devices, or services; types of devices or services; and interrelationships thereof may be used.

Figure 2A:
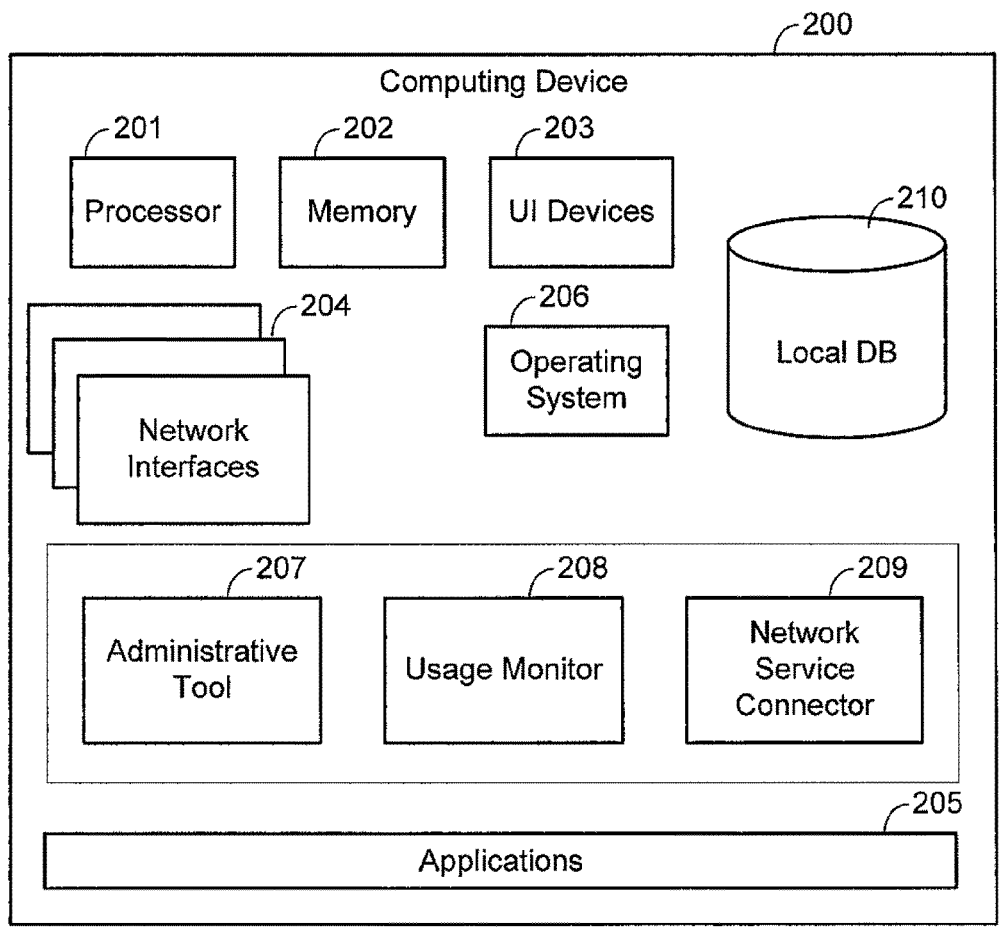
FIG. 2A shows a block diagram of a user device according to some embodiments.

FIG. 2A shows a block diagram of a user device 200 according to some embodiments. User device 200 may be any suitable type of computing device. For example and not limitation, user device may be any of the user devices illustrated in exemplary usage scenario 100 (FIG. 1). User device 200 is illustrative and a specific embodiment of a user device may have components other than the components show in FIG. 2A. In some embodiments, user device 200 comprises a processor 201, memory 202, user interface (UI) devices 203 and network interfaces 204.

Processor 201 may be a processor as known in the art or any suitable processing device. For example and not limitation, processor 201 may be a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Memory 202 may store data and/or software modules containing computer-executable instructions that when executed by processor 201 perform a desired function. Memory 202 may be a computer-readable storage medium as is known in the art or any suitable type of computer-readable storage medium. For example and not limitation, memory 202 may be RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, other semiconductor devices, or other tangible computer storage medium or combination thereof.

UI devices 203 may include any type of UI device for providing and/or receiving information including user interface devices as known in the art. I/O devices 103 may include, for example and not limitation, a keypad such as a keyboard, pointing device such as a mouse or trackball, microphone, joystick, touch screen display, display, speaker, removable storage drives, or a combination thereof.

User device 200 may include any suitable number of network interfaces 204. Each network interface may be an interface suitable for wired and/or wireless communication and may be implemented through any suitable combination of hardware and software configured to communicate over a network. For example, a network interface may be implemented as a network interface driver and a network interface card (NIC). The driver may be configured to receive instructions from other components of user device 200 to perform operations with the NIC.

A wired network interface may be any suitable type of interface for connecting to a network over a wire (e.g., Ethernet, fiber-optic, coaxial).

A wireless network interface may contain hardware components, such as a transmitter and receiver to receive and transmit information wirelessly to and from user device 200. Each wireless network interface may be configured to support any suitable wireless communications protocol. For example, a wireless interface may be configured to support any standard or proprietary communications protocol, such as those for wireless personal area network (WPAN), wireless local area network (WLAN), wireless local area network (WLAN), wireless metropolitan area networks (wireless MAN), wireless wide area network (WWAN), or other types of networks. Network interfaces 204 may, for example and not limitation, be configured for use with any of IEEE 802.11, Wi-Fi, ultra-wide band (UWB) technologies, Bluetooth, Wireless USB, WiMedia, WiMax, Wireless 1394, Code Division Multiple Access (CDMA), Time Division Multiple Access (TDMA), Global System for Mobilization (GSM), Cellular Digital Packet Data (GPRS), or General Packet Radio Service (GPRS).

User device 200 may also include modules configured to perform specific functions. In the illustrated embodiment, user device 200 includes an operating system 206 (OS) and applications 205. Though, user device 200 may have any suitable modules. Modules may be implemented in hardware, software, or any suitable combination thereof. In some embodiments, a module may comprise computer-executable instructions. The instructions may be stored in memory 202 and executed by processor 201.

OS 206 may manage the activities and sharing of resources of user device 200. OS 206 may provide various functions and manage user device 200 through various components. These components may include, for example and not limitation, dynamically linked libraries (e.g., a dynamic-link library), application programming interfaces (APIs), component object models (COMs), globally unique identifiers, registry keys, or any uniquely identifiable part of OS 206.

Applications 205 may include any suitable computer applications. In the embodiment illustrated, applications 205 may consume network resources. For example, applications 205 may send and receive e-mails, download files or access web pages. Though, user device 200 may include any suitable applications.

Device 200 may further include components to manage network usage. These components may include, for example, an administrative tool 207 that allows an administrative user to set budget limits and specify actions upon reaching thresholds associated with these limits, a usage monitor 208, and a network service connector 209. These components may be part of the operating system or may be regarded as applications. However, the implementation as an application or operating system component is not critical. For example, in some embodiments, administrative tool 207, usage monitor 208, and network service connector 209 may be implemented as modules of operating system 206.

Network service connector 209 is a module for establishing, maintaining and terminating connectivity between network services and user device 200. Network service connector 209 may control network interfaces 204 to provide connectivity to the network services.

Administrative tool 207 is a module for managing a consumer's or group of consumers use of one or more network resources. Administrative tool 207 may provide an interface through UI devices 203 through which a consumer or an administrator may manage subscriptions to network services. In some embodiments, administrative tool 207 is restricted for use to one or more administrators. Users that are not administrators may not be able to use administrative tool 207 or may only be able to view information without the ability to make changes. Though, access to administrative tool 207 may be configured in any suitable way.

In some embodiments, administrative tool 207 provides an interface for reviewing how the network resources are being consumed. Administrative tool 207 may detail which consumers have used a network resource, when they used it, how much they used, what device or application they used to consume the resource, and the like. Administrative tool 207 may also provide an interface for establishing policy for how the network resources may be used. Administrative tool 207 may provide an interface for setting budgets for resource consumers. For example, resource consumers such as users, devices and applications may each have a budget set through administrative tool 207. Administrative tool 207 may also be used to set thresholds for warning a user that a budget or usage limit is being approached. The resource consumption by users or user groups, devices and applications may be checked against the policy and presented through a user interface of administrative tool 207. Some examples of a user interface of administrative tool 207 are subsequently discussed with reference to FIGS. 7-12.

Usage monitor 208 is a module for monitoring consumption of network resources on device 200 and/or other devices that share a subscription. Usage monitor 208 may be configured to track usage and determine whether a budget for a network resources has been met or exceeded. In some embodiments, usage monitor 208 provides an indication that a threshold associated with a budget has been exceeded. Usage monitor 208 may be used to predict if or when a budget or usage limit will be exceeded. In some embodiments, usage monitor 208 reports network resource usage to administrative tool 207. If administrate tool 207 is on another device, a network connection may be used to report usage to administrative tool 207.

In some embodiments, usage monitor 208 interacts with network service connector 209 to issue commands that prevent or limit further access to a network resource once a budget or usage limit has been reached. Though, in some embodiments, usage monitor 208 may not limit use of the network resource. In some embodiments, usage monitor prompts a user regarding an approaching or reached budget and asks the user if she wishes to continue using the network resource, potentially at additional cost. In some embodiments, usage monitor 208 may present an option to switch to a different network resource, for example, a resource provided by another network service provider.

Usage monitor 208 may obtain information about thresholds, budgets and usage limits from database 210. Use of a network resource may be recorded by usage monitor 208, for example, in database 210. In some embodiments, use of the network resource may be obtained from a network service provider or measured using network interfaces 204. Though, usage monitor 208 may obtain information in any suitable way.

Usage monitor 208 may obtain information on usage of a network resource from network service connector 209. In addition to obtaining information on usage of a network resource, usage monitor 208 may obtain information about the connection over which the network is accessed. The connection, for example, may identify the user controlling the process that formed the connection or the application accessing the connection. In some embodiments, a web service is used to obtain network resource usage information. In this way, information about usage by user and application may be collected.

Usage monitor 208 may alternatively or additionally obtain usage information from other sources. For example, usage monitor 208 may obtain usage information from a network service provider. As another example, in instances where a network subscription may be access from multiple devices, monitor 208 may obtain usage information from other devices, from a central repository to which all of the devices provide information or any other suitable location.

Figure 2B:
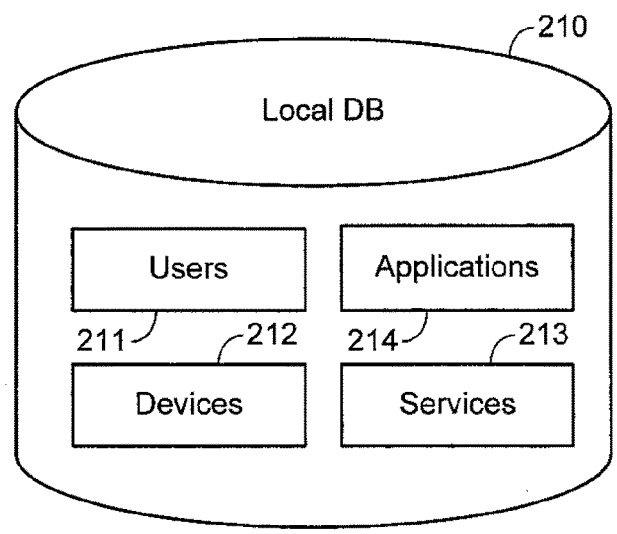
FIG. 2B is a block diagram of a database according to some embodiments.

Regardless of where usage information is obtained, the details of network resource usage as well as policy settings used and generated by the administrative tool 207 may be stored as management information. In some embodiments, the management information is stored and indexed in database 210. As shown in FIG. 2B, the management information stored in database 210 may include user information 211, user device information 212, network services information 213, and applications information 214. Though, the management information may include other types of information and other types of information may be included in database 210. User information 211 may include information about one or more users, such as budgets assigned to a user and network services, devices and applications available to a user. User device information 212 may include information such as a budget assigned to the user device. Network services information 213 may include information about network services that may be accessed (e.g., service plans), the network resources available from each network service, and usage limits associated with each network resource. Applications information 214 may include information about budgets assigned to specific applications or groups of applications. Though, it should be appreciated that management information may include any suitable information and may be organized in any suitable way.

In some embodiments, database 210 may only include information relevant to the users of the user device 200 and the services and applications available on user device 200. In some embodiments, database 210 may be a comprehensive database of user, device, application, and network service information. Though, any suitable data may be stored in database 210.

Database 210 may be stored in memory 202. In some embodiments, database 210 is a remote database accessible via a network service. Though, database 210 may be stored in any suitable location or multiple locations. In some embodiments, only a portion of database 210 may be stored locally. For example, the management information related to user device 200, its users and applications may be stored locally.

In some embodiments, user device 200 may be configured to control when time-insensitive content is downloaded. In some embodiments, time-insensitive content is downloaded when usage of the corresponding network resource is below a corresponding threshold. For example, user device 200 may perform time-insensitive downloads if less than 20% of the network resource has been consumed. In this way time-insensitive content such as application updates may be queued for the beginning of a resource usage period avoiding interfering with users at the end of the resource usage period where the network resource may be scarce. In some embodiments, user device 200 may download time-insensitive content late in the resource usage period to minimize or eliminate waste of the network resource. For example, if use of a network resource is projected to be less than the usage limit the shortfall may be consumed with time-insensitive downloads.

Figure 3:
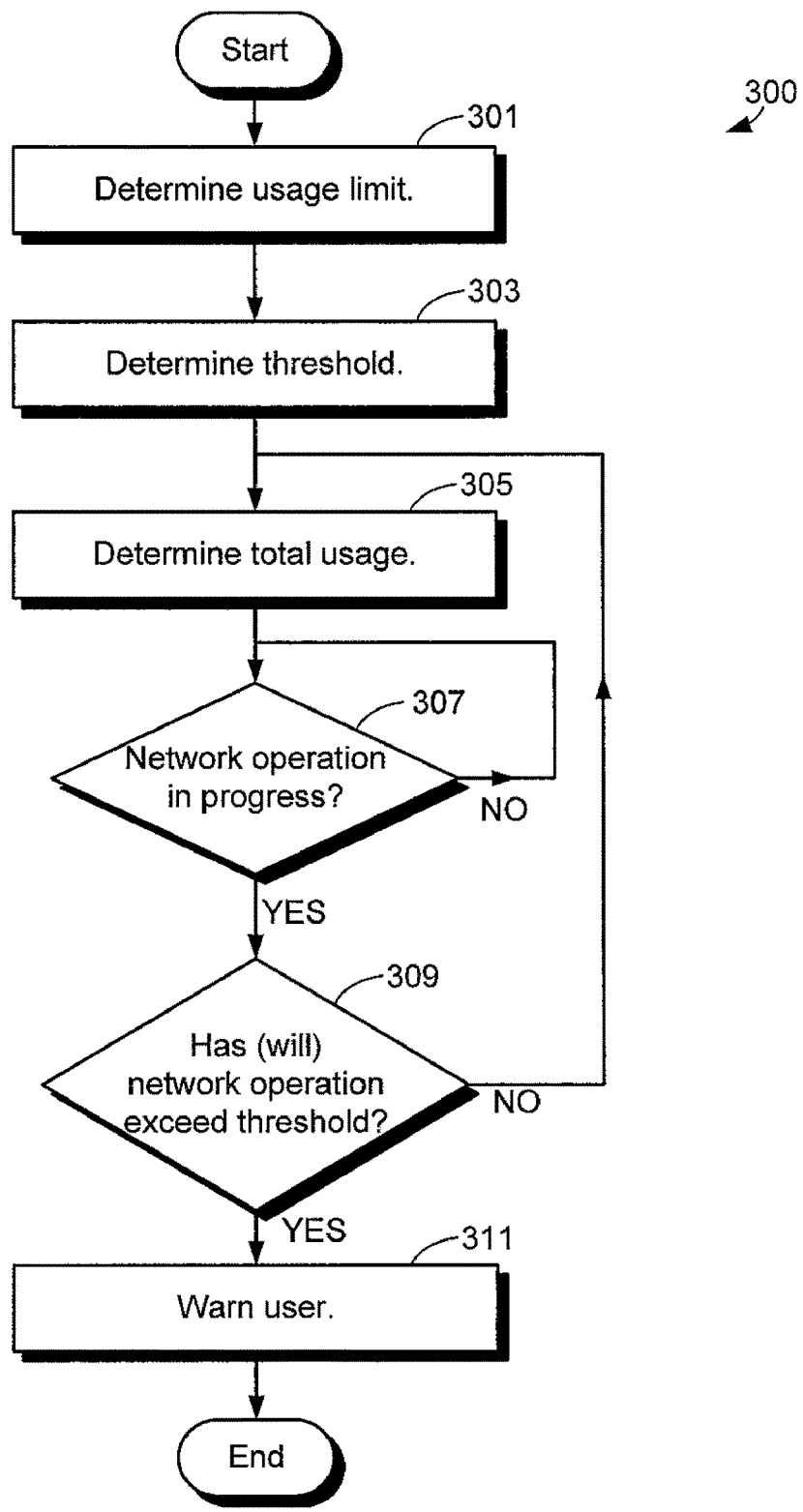
FIG. 3 is a flow diagram of a method of managing a network resource according to some embodiments.

Having discussed an exemplary usage scenario and the details of a user device, a method 300 of managing a network resource of a network service is discussed with reference to FIG. 3. In some embodiments, method 300 is a computer-implemented method. The steps of method 300 may be performed on a single computer or performed by two or more computers. Though, method 300 may be implemented in any suitable way. In some embodiments, method 300 is implemented, at least in part, on a user device.

At step 301, the usage limit for a network resource of a network service is determined. The usage limit represents an amount of the network resource the user (or group of users) may consume. The usage limit may be a hard limit that may not be exceeded, or a soft limit that indicates to the user network resource consumption or makes the user aware of changing terms for using the network resource. For example, the usage limit may indicate how much of the network resource the user, or users sharing the network resource, may consume before being charged at a different rate than a current rate.

In some embodiments the network resource is data transferred using a network service and the usage limit represents the amount of data transfer that may be performed for the user or group of users by the network service. For example, a daily, weekly or monthly usage limit may be set. Though, the usage limit may apply to any suitable time period. In some embodiments, transfer of data is limited by a single usage limit. For example, the usage may be defined as the total upload and download of data. In some embodiments, separate "upload" and "download" usage limits may be defined. Separate instances of method 300 may be performed for managing upload data transfer and download transfer. Though, method 300 may be implemented in any suitable way.

Any suitable network resource may be monitored. For example, in some embodiments, the network resource is access time. That is, the amount of time the network is accessed. Another example of a network resource is upload and/or download data transfer rate. That is, the throughput of data to and/or from a user device or group of user devices sharing the network resource. Though, method 300 may be applied for any suitable network resource.

The usage limit may be determined by accessing a database on a user device or on a remote server, or from received user input. Though, the usage limit may be determined in any suitable way. In some embodiments, the usage limit is determined by querying a server over a network connection to the network service.

At step 303, at least one usage threshold is determined. A usage threshold represents a level of consumption of the network resource at which a notification should be output to the user. In some embodiments, a usage threshold is defined as a fraction of the usage limit. For example, the usage threshold may be defined as a percentage of the usage limit, such as, 80, 90, 95, or 100%. In some embodiments, the usage threshold is defined as a definite value. A usage threshold having a definite value may have the same base unit (e.g., byte) as the usage limit. For example, if the network resource is data the usage limit may be 500 megabytes (MB) and the usage threshold may be defined as 400 MB. Though, the threshold may be defined in any suitable way.

Unless indicated otherwise, for simplicity the usage threshold is hereinafter taken to have a definite value. If the threshold is defined relative to the usage limit it may easily be converted into an absolute threshold. For example, if the threshold is defined as a percentage (e.g., 90%), the absolute threshold is simply that percentage of the usage limit (i.e., 90% of the usage limit). The threshold may be determined in ways similar to the usage limit. For example, the threshold may be input through an administrative tool, determined from a local or remote database, or from user input. Though, the threshold may be determined in any suitable way.

At step 305, the total amount of the network resource currently consumed is determined. The amount consumed may be determined from a local record of usage, determined from user input, accessed over the network, or determined in any suitable way.

At step 307 a determination is made whether a network operation is in progress. A network operation could be any operation that results in any form of consumption of the network resource that is being managed. If the network resource is transferred data, a network operation may include copying that data over a network service, for example, sending information (uploading), receiving information (downloading), or a combination of uploading and downloading.

Method 300 waits at step 307 until a network operation begins before continuing to step 309. At step 309, a determination is made whether the network operation has caused (or will cause) consumption of a network resource to exceed the threshold. In some embodiments, one or more thresholds may be checked at step 309. For example, method 300 may check resource usage against multiple thresholds at step 309 (e.g., at 80, 90, 95 and 100%). Though, in some embodiments separate instances of method 300 are performed to check each threshold.

If the network operation relates to a determinable quantity of content, the total usage after completing the network operation may be predicted and compared to the threshold. The total usage may, for example, be predicted by adding the total usage determined at step 305 to the quantity of content to be loaded. If the network operation relates to an indeterminate amount of content, such as a live media stream or a telephone call, method 300 may compare the total amount of network resource consumed to the threshold.

Figure 4B:
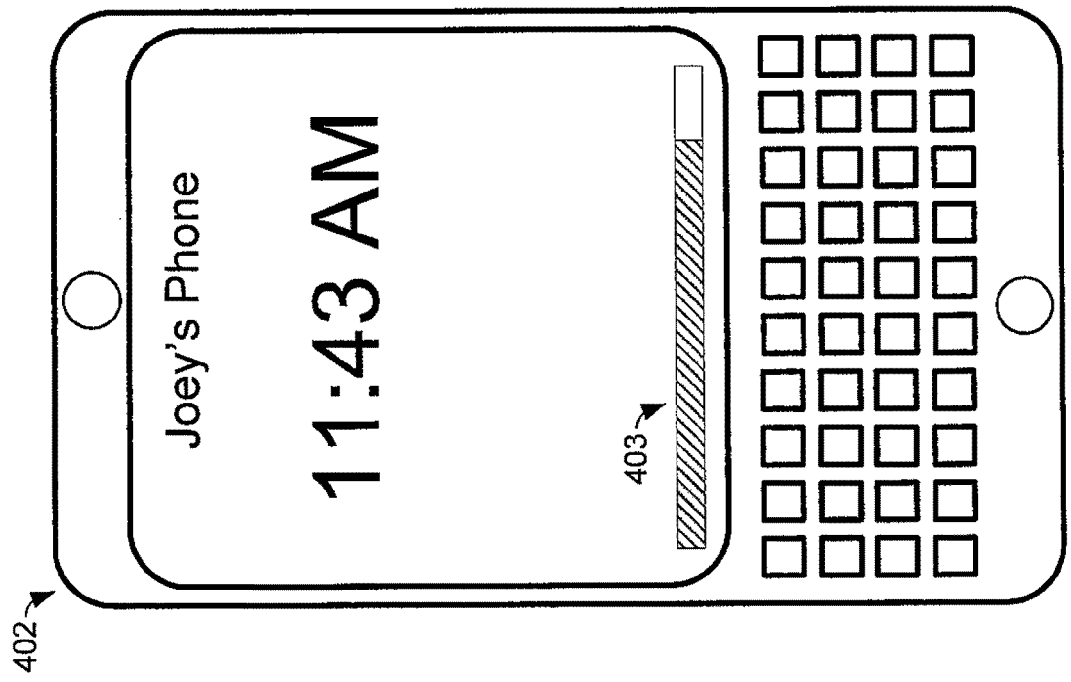
FIGS. 4A-4B show indicators of network resource consumption according to some embodiments.
Figure 4A:
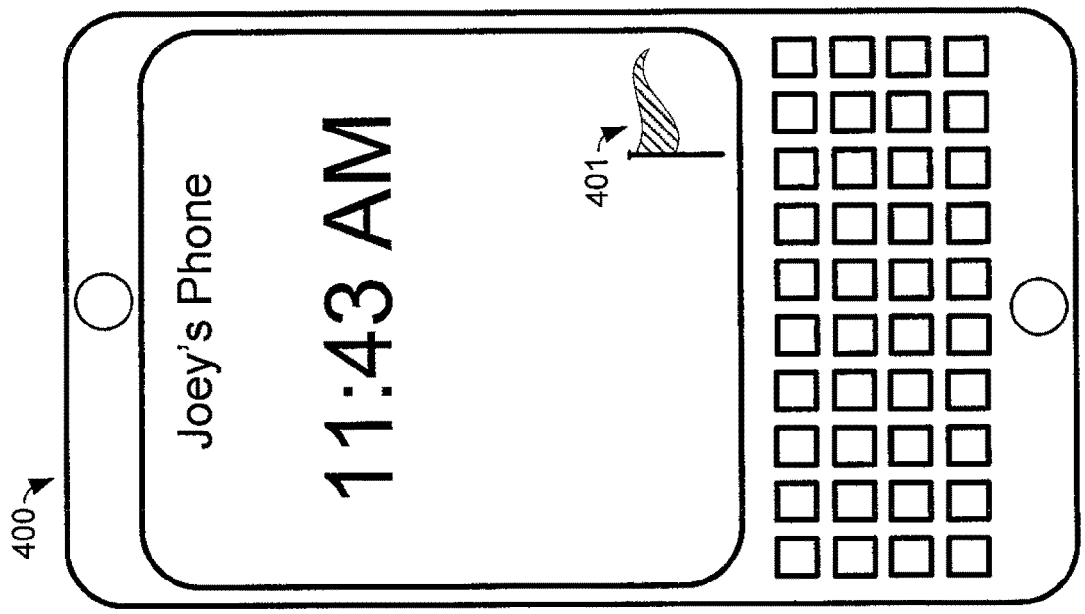

In either case, if the threshold is not exceeded, the method returns to step 305. If, however, the threshold is exceeded, method 300 continues to step 311 and an appropriate action is taken. For example, further access to the network resource may be blocked or limited, the user device may be switched to a different network service provider, or a warning indication may be output to the user. For example, an audible sound may be made, a message may be displayed, total consumption of the network resource displayed, or a percent consumption of the resource relative to the usage limit displayed. FIGS. 4A-4B, discussed below, illustrate some example embodiments of a warning indicator.

Method 300 may more generally be used to managing any budget, not just usage limits. A budget may include an amount of the network resource a user, device or application may consume before some action is triggered—whether that action is issuing a warning, blocking further usage of the network resource or other suitable action. Though, a budget may be set for any one or more users, devices, applications or other entities. The budget may be obtained in ways similar to obtaining the usage limit discussed above. If the budget has not been set by the user or a group administrator, a suitable default value may be selected. For example, the default value may be the usage limit or the usage limit divided by the number of users of the network resource sharing the usage limit.

In some embodiments, multiple instances of method 300 may be executed for managing the same or different network resources. Separate instances of method 300 may be implemented for each budget that pertains to a network resource that is being consumed. Though, a single instance of method 300 may be used to track multiple budgets. For example, budgets relating to a user, a device, and application may simultaneously be managed by a single instance of method 300 or separate instances of method 300 may be used to manage the budgets. Similarly, the same or different instances of method 300 may be used to check each of multiple thresholds. Single or multiple instances of method 300 may be used to manage multiple budgets or thresholds in any suitable way.

Some embodiments of the warning indicator discussed above with reference to step 311 are shown in FIGS. 4A-4B. FIG. 4A shows a user device 400. A flag 401 indicates that the user device has exceeded a threshold associated with a network resource. If multiple thresholds are set, the color of the indicator may be used to indicate the highest exceeded threshold. For example, a yellow flag may indicate 80% of the network resource usage limit has been consumed. Similarly, an orange flag and a red flag may be used to indicate 90% and 95%, respectively, of the network resource usage limit has been consumed.

FIG. 4B shows a user device 402 displaying a warning indicator 403 according to some embodiments. Indicator 403 is a progress bar indicating the consumption of the network resource relative to the usage limit. For example, the entire length of indicator 403 may represent a usage limit or other budget, and the patterned portion may represent how much of the network resource has been consumed. In the example, indicator 403 shows that about 85% of the resource being monitored is consumed.

It should be appreciated that indicators 401 and 403 shown in FIGS. 4A and 4B, respectively, are merely exemplary. Consumption of the network resource may be indicated in any suitable way.

Figure 5:
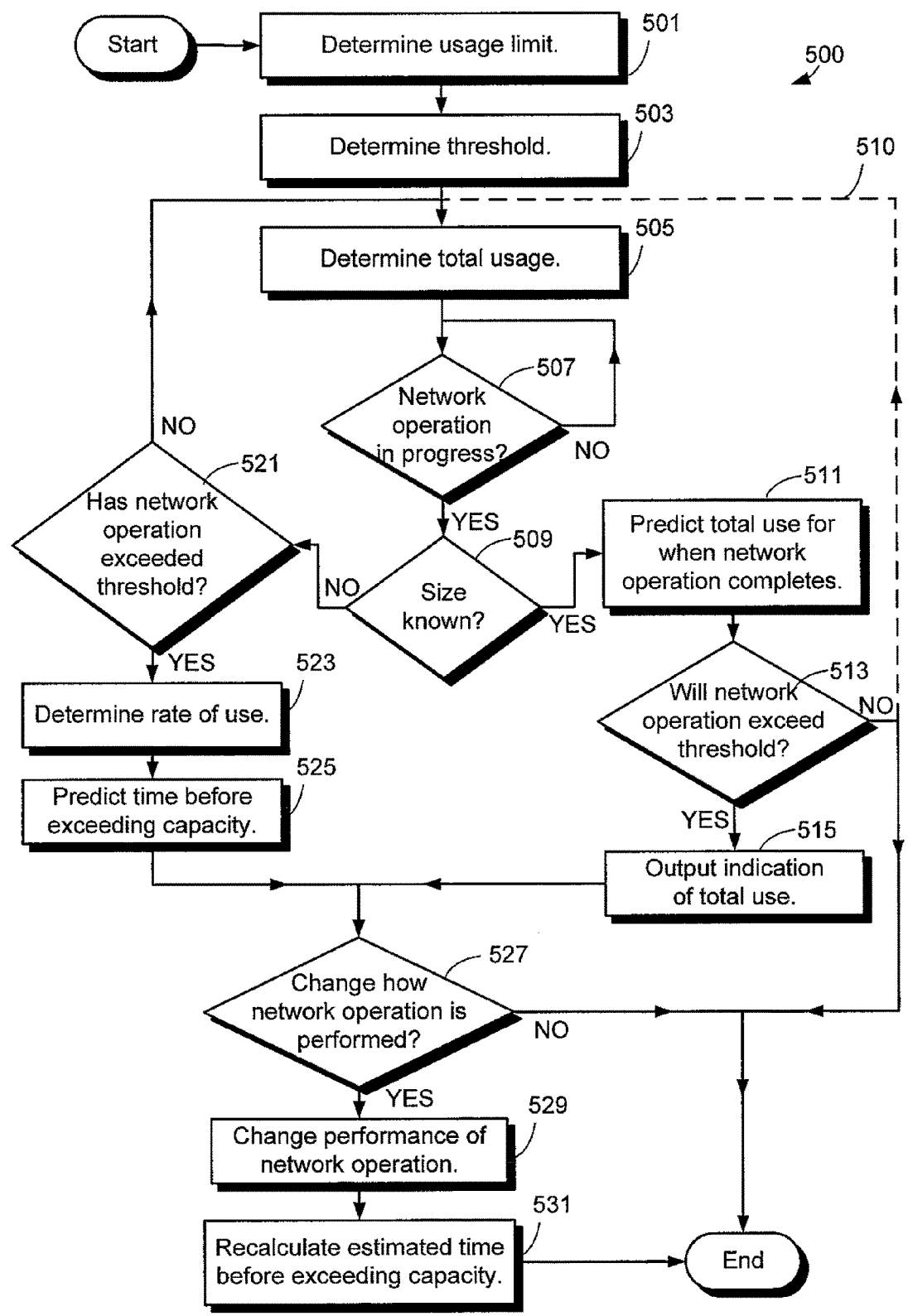
FIG. 5 is a flow diagram of a method of managing a network resource according to some embodiments.

FIG. 5 is a flow diagram of a method 500 of managing a network resource according to some embodiments. In some embodiments, method 500 is a computer-implemented method. The steps of method 500 may be performed on a single computer or performed by two or more computers. Though, method 500 may be implemented in any suitable way. In some embodiments, method 500 is implemented, at least in part, on a user device.

At step 501, a usage limit is determined. At step 503, a threshold is determined. At step 505, the total usage is determined. At step 507 it is determined if a network operation is in progress. Steps 501, 503, 505 and 507 may be performed in ways similar to steps 301, 303, 305 and 307 of method 300 (FIG. 3), respectively. It should be appreciated that method 500 may be used to test one or more the thresholds related to the usage limit. Accordingly, more than one threshold may be loaded at step 503. Though method 500 is described with reference to a usage limit, it should be appreciated method 500 may be applied to managing a budget of a network resource.

Method 500 continues to check for a network operation at step 507 until a network operation is detected, then proceeds to step 509. At step 509, method 500 determines if the content corresponding to the network operation has a know size. For example, if a file is being downloaded, metadata sent before or with the file may indicate the file size. Though, content size may be determined in any suitable way. On the other hand, if, for example, the user device is receiving streaming media of unknown length (e.g., a live stream) or is engaged in a telephone call, the amount of network resource consumed to complete the loading may be unknown.

If the size is known, method 500 continues to step 511. At step 511 the total network resource usage for when the network operation completes is predicted. The total resource usage may be predicted by adding the total usage determined at step 505 to the amount of content to be loaded to complete the network operation.

At step 513 it is predicted whether the total network resource usage after the network operation is complete will exceed the threshold. If it is determined the threshold will not be exceeded, method 500 may end. Though, in some embodiments, method 300 may return to step 505 to continue monitoring the threshold as shown by dashed line 510.

If it is predicted at step 513 that the threshold will be exceeded, method 500 continues to step 515 and outputs an indication of the total use of the network resource. Total use may be indicated in ways similar to those discussed above at step 311 of method 300, in the ways shown in FIGS. 4A-4B, or in any suitable way. After step 515 method 500 may end or return to step 503 to load another threshold and continue (not shown). In some embodiments, the indication of total use may prompt the user asking whether they wish to continue the network operation or change how the network operation is performed. Method 500 may then continue to step 527 which is discussed below.

Returning to step 509, if it is determined that the data does not have a known size, method 500 continues to step 521.

At step 521, it is determined whether the network operation has exceeded the threshold. In some embodiments, the determination is made by comparing the total usage of the network resource determined at step 505 to the threshold determined at step 503. Though, the determination may be made in any suitable way. If it is determined at step 521 that the total usage of the network resource does not exceed the threshold, method 500 returns to step 505.

If, however, the threshold is exceeded, method 500 continues to step 523 where the rate of use is estimated. Estimating the rate of use may be performed in ways known in the art. In some embodiments, the rate of use may be estimated by dividing the total amount of the data transmitted and/or received by the user device during a fixed time interval by the length of the time interval. For example, the rate of use may be determined as an amount of data loaded per second. Though, the rate of use may be determined in any suitable way.

At step 525, the amount of time before exceeding the usage limit is predicted. In some embodiments, the difference between the usage limit and the total use is divided by the rate of use to estimate the time. An indicator may be used to show the amount of time before exceeding the usage limit.

In some embodiments, method 500 may provide the option to change how the network operation is being performed at step 527. If changing how the network operation is performed is not available or not desired ("No", step 527), method 500 may end or return to step 503 to monitor for another threshold (not shown).

If changing how the network operation is performed is available, at step 527 it is determined whether such a change is desired. Whether a change is desired may be determined by policy, user input, or in any suitable way. In some embodiments, the user is prompted that the usage limit is being approached. The prompt may give the user the option to continue the network operation at the current quality, to reduce the quality of the network operation, to cancel the network operation, to switch to another network, or to perform any other suitable action. In some embodiments, a policy may be evaluated to determine if and how performance of the network operation should be changed. In some embodiments, a determination is made whether the content is available using another network service available to the device. A list of network services through which the network operation may be performed may be presented to a user for selection of a network service. Though, a network service may be selected automatically, for example, if the user does not respond to the prompt.

If it is determined at step 527 not to change how the network operation is performed, method 500 may end. If it is determined at step 527 to change how the network operation is being performed, method 500 continues to step 529. At step 529, how the network operation is being performed is changed. For example, the network operation may be performed on a different network or at reduced quality using the current network. In some embodiments, the quality is reduced by reducing the rate of use of the network resource. For example, an audio stream encoded at 128 kilobits per second may be reduced to 64 kilobits per second. In some embodiments, the quality may be reduced by switching to a lower priority connection. In some embodiments, the network operation is cancelled.

If the file size of the content of the network operation is unknown, after changing performance of the network operation, method 500 may recalculate, at step 531, the amount of time the network operation may continue before exceeding the usage limit. After recalculating at step 531 or, if the file size is known, method 500 may end.

Figure 6C:
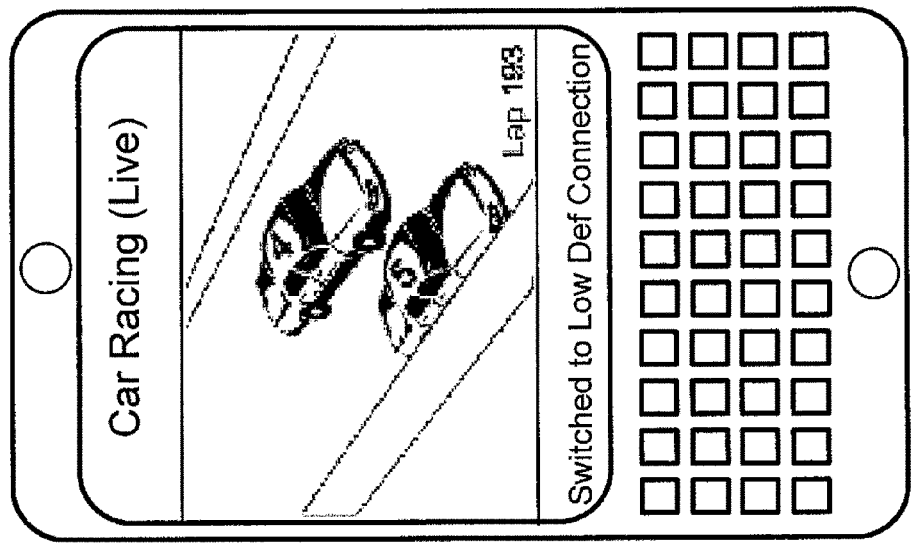
FIG. 6C shows a user device that is communicating with a network service using a low bandwidth connection in response to a user selection.
Figure 6B:
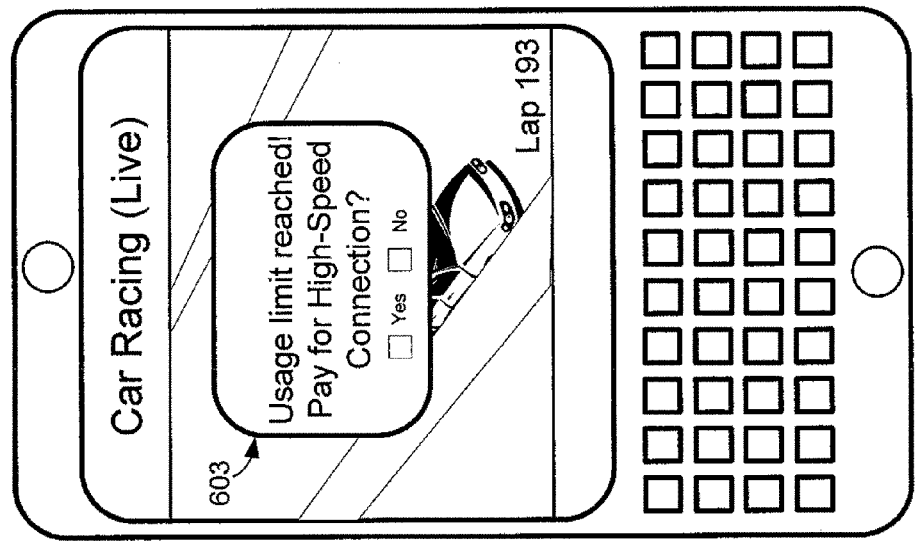
FIG. 6B shows a prompt displayed on a user device indicating a usage limit of a network resource has been reached.
Figure 6A:
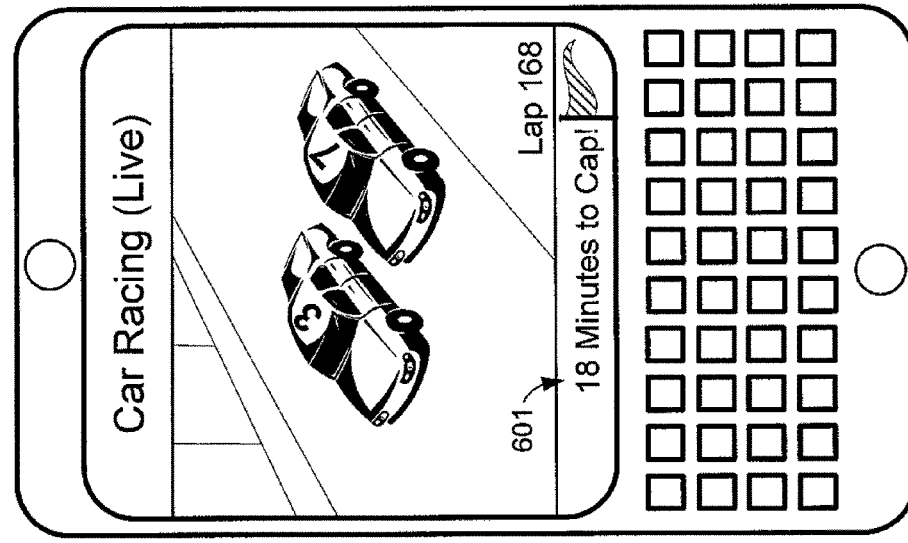
FIG. 6A shows an indicator of network resource consumption according to some embodiments.

FIG. 6A-6C show warning indicators displayed on a user device 600 while loading content of unknown size. In FIG. 6A, user device 600 displays a warning indicator 601 when a threshold has been exceeded. The indicator displays an amount of time before the usage limit is predicted to be exceeded. In some embodiments, the indicator counts down until the capacity is reached. In addition to counting down based on a system clock, the predicted amount of time may be periodically updated by recalculating the rate of use and using the new rate to predict the amount of time until the usage limit is reached.

FIG. 6B shows user device 600 displaying a prompt 603 to the user. Prompt 603 indicates that a threshold has been reached (usage limit in this example), and asks the user to indicate if a reduction in quality should be made. Specifically, prompt 603 prompts the user to indicate whether she wishes to continue pay for a high-speed connection. If the user selects "Yes" the high-speed connection is maintained. If the user selects "No" the connection may be terminated because the usage limit has been reached, or the user may switch to a different network resource. FIG. 6B shows user device 600 after the user selects "No" according to some embodiments. In this example, user device 600 is configured for a lower definition network service and continues the loading process, though, at a lower quality. If the user does not respond to the prompt in a timely fashion, user device 600 may determine if and how to change performance of the network operation.

Having discussed methods for managing and predicting usage of a network resource, an administrative tool is described with reference to FIGS. 7-12. As discussed above, the administrative tool allows an administrator of the group of users to review usage of network resources by the group of users and set budgets for users, devices and applications as desired. The administrative tool may be used for managing network services, for example, in a domestic, professional or individual setting. Though, the administrative tool may be used for any suitable group of one or more users.

For purpose of illustration of the administrative tool, a group of four users and their devices and network services are described with reference to an embodiment of a user interface of the administrative tool. It should be appreciated that the administrative tool may be used for any suitable group of users, devices and services.

Figure 7:
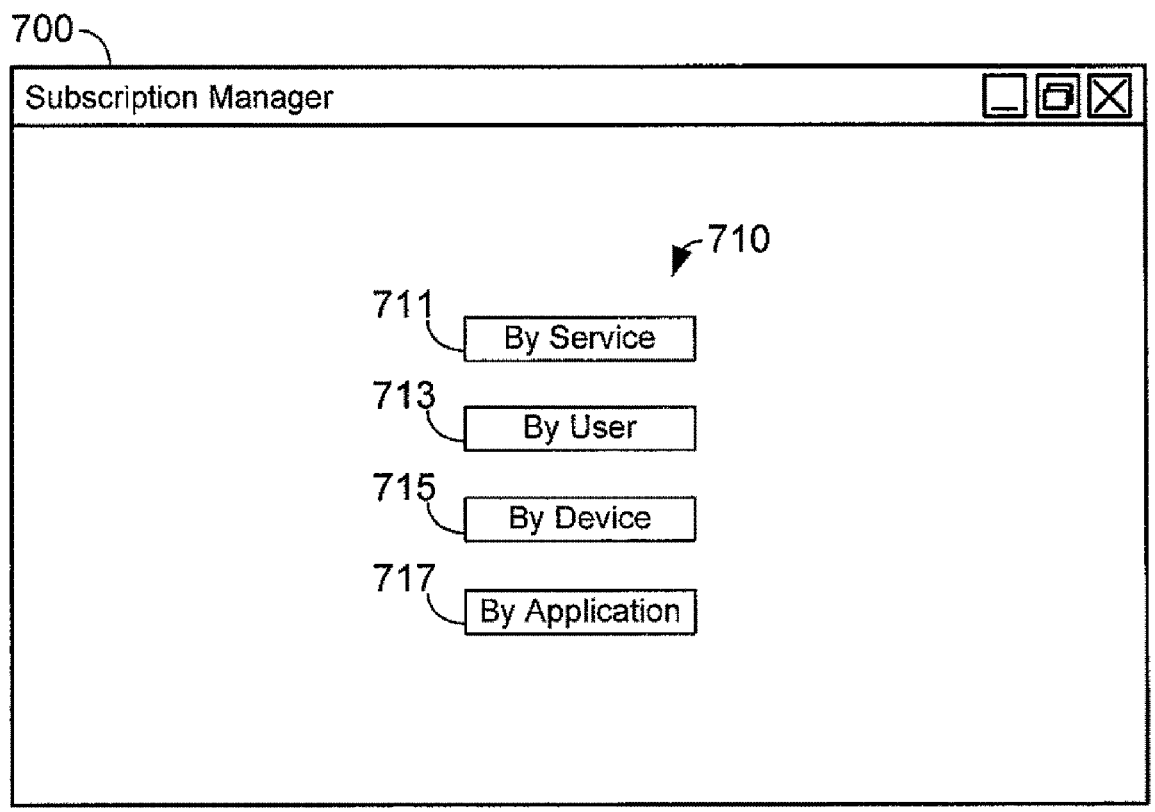
FIGS. 7-12B show user interfaces of an administrative tool according to some embodiments.

FIG. 7 shows a user interface 700 of the administrative tool according to some embodiments. The user interface may be provided on a user device having access to a database related to the group of users. For example, the administrative tool may be an application 205 on a user device 200 having access to a local or remote database, such as database 210 (FIGS. 2A-2B). User interface 700 may provide selection options 710 for the administrator for managing network services. In some embodiments, selection options 710 provide different ways for the administrator to manage and control a set of network services. In the illustrated embodiments, selection options 710 include an option 711 for managing by network service provider, an option 713 for managing by user, an option 715 for managing by device, and an option 717 for managing by application. Each of these options are presently discussed.

Figure 8A:
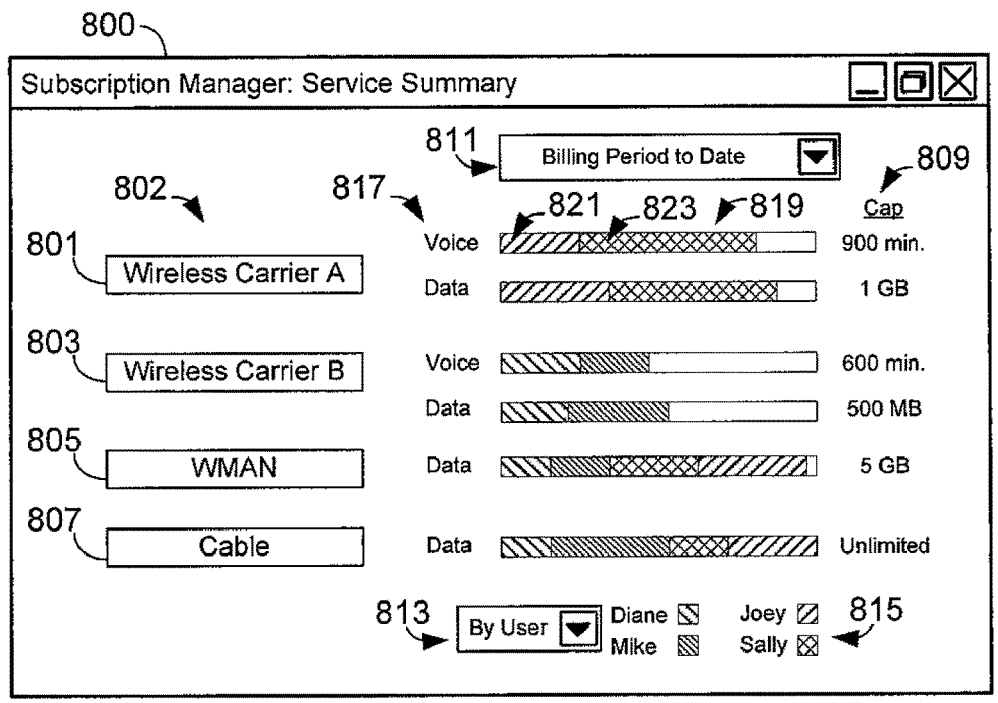

FIG. 8A shows a user interface 800 of the administrative tool when, for example, the option for managing by network service provider is selected (e.g., option 711, FIG. 7). User interface 800 includes a list of network services 802. Illustrated in user interface 800 are four network services: wireless carrier A 801, wireless carrier B 803, a Wireless Metropolitan Area Network (WMAN) service 805 and a cable service 807. The list of network services 802 are exemplary, and an administrative tool may be configured to manage and suitable set of network services.

User interface 800 provides a summary for each network service 802. The summary may include, for example, information about cost of the network service, the network resources 817 provided by the network service, a summary of usage 819 of each network resource, a usage limit 809 for each network resource, information about how use of the network resource is calculated (peak or off-peak times), which users and devices access the network service, and any other information related to the network service.

Each network resource 817 may have a usage limit 809 associated with it. The summary of usage shows the total use of each network resource. For example, Wireless Carrier A has two network resources being managed: voice and data. The voice network resource has a usage limited of 900 minutes and the data network resource has a data limit of 1 GB. While here, for simplicity, voice is shown as a single network resource, it should be appreciated that different kinds of voice usage may be treated as different network resources. Wireless carriers may set separate usage limits for voice usage base on the day, time, call origin, call destination, or any other factor. For example, daytime, peak, off-peak, regional, national, international, preferred country, and other kinds of voice usage may each be treated as separate network resources. A user may have, for example, an account where off-peak/national calling is unlimited, daytime/national has a usage limit of 900 minutes per month, and international calling is billed at a per minute rate. Each could be treated as a distinct network resource.

An option 811 may be used to control what time period the displayed usage data relates to. For simplicity, user interface 800 uses the same period for each network service. Though, different periods may be used for each network service, and/or network resource.

In addition to displaying the total use of each network resource, the usage may be broken down into further details. For example, the total use may be broken into segments attributable to each user, device, or application. Though, data use may be displayed in any suitable way. User interface 800 shows an example where option 813 has been selected to break down total use by user. In the example of user interface 800 a progress bar-type chart is shown with each user's use represented by a different pattern. A legend 815 is used to interpret the patterns. In the example, a first portion 821 of the voice use of Wireless Carrier A was used by user "Joey" and a second portion 823 was used by user "Sally". The use of a progress bar-type chart is illustrative, and any suitable way of indicating usage may be provided. In some embodiments, a network service provider may provide the network resource using one or more different technologies. For example, wireless data transfer may be provided by a mobile carrier using 2G, 3G, or WiMAX. Option 813 may be displayed such that resource usage may be presented to show how much of a network resource was used using each technology. In some embodiments, communication using each technology is treated as a separate network resource. For example, separate usage limits may be set for 2G, 3G, and WiMAX communications.

Note that cable service 807 is shown to have a unlimited usage limit of data. The administrative tool may be useful, even for unlimited resources, to manage or limit usage of certain users, devices, or applications.

Figure 8B:
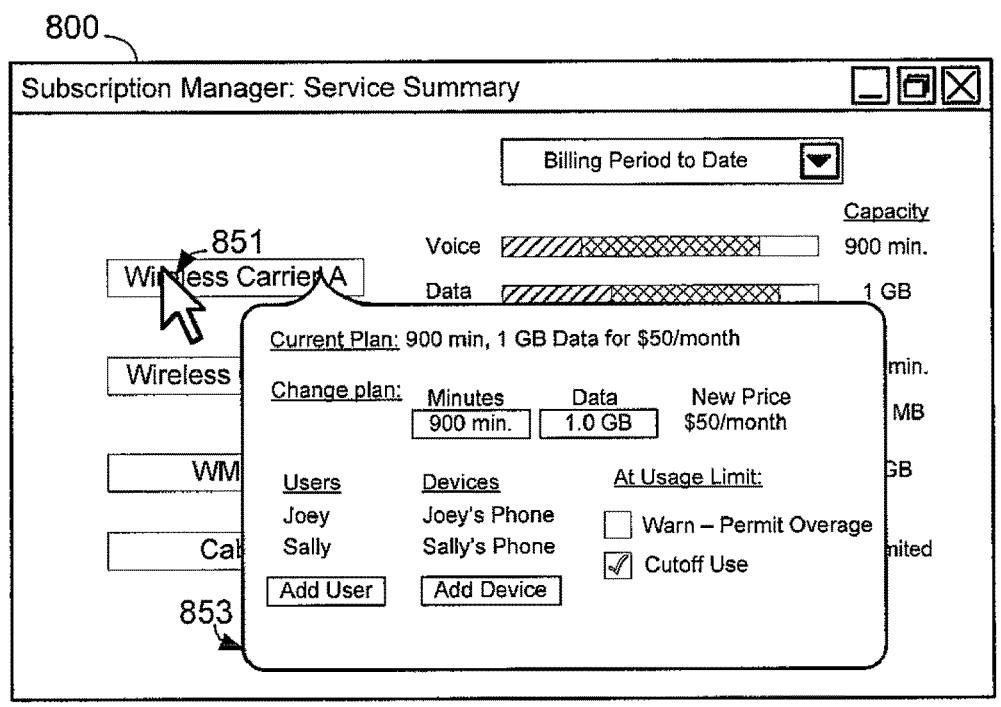

FIG. 8B shows user interface 800 after selection of a network service from the list of network services according to some embodiments. Selection may be made, for example, using a cursor 851 and a suitable pointing device (not shown). In the illustrated example, a pop-up window 853 is displayed when Wireless Carrier A is selected. Pop-up window 853 may be used to show information about the service plan associated with the network service, which users may access the network service, and which devices may connect to the network service. In some embodiments, an option change the service plan may be available. For example, the usage limits of a network resource may be adjusted. Also, users and devices may be added or removed from the network service.

In some embodiments, an indication of what behavior should occur if the usage limit is reached. A policy may require a warning be issued to users of the network service or that access to the service be stopped once the usage limit is reached. In some embodiments, policy may be set globally for the service or, for example, on a per user, per device, or per application basis.

Figure 9A:
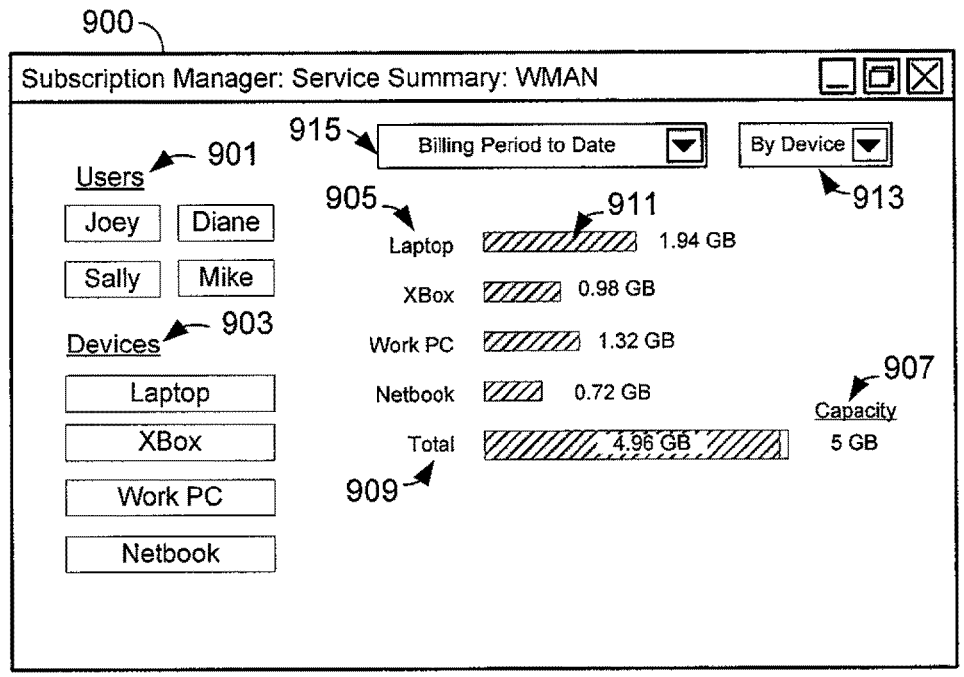

FIG. 9A shows a user interface 900 of the administrative tool when a particular network service is selected for inspection. For this example, the WMAN service is selected. Associated with the WMAN service may be a group of users 901. A group of devices 903 may also be associated with the WMAN service.

User interface 900 may show a break down of the network resource usage on the WMAN. In this example, the network resource is transmission of data and has a usage limit 907 of 5 GB. In addition to providing total use 917, details of use may be broken down, for example, by user, device, or application. In the example shown in FIG. 9B, option 913 is selected to break down usage by device. A list of devices 905 and the use 911 of the network resource by each device may be shown. The time period for which usage information is displayed may be adjusted with option 915.

Figure 9B:
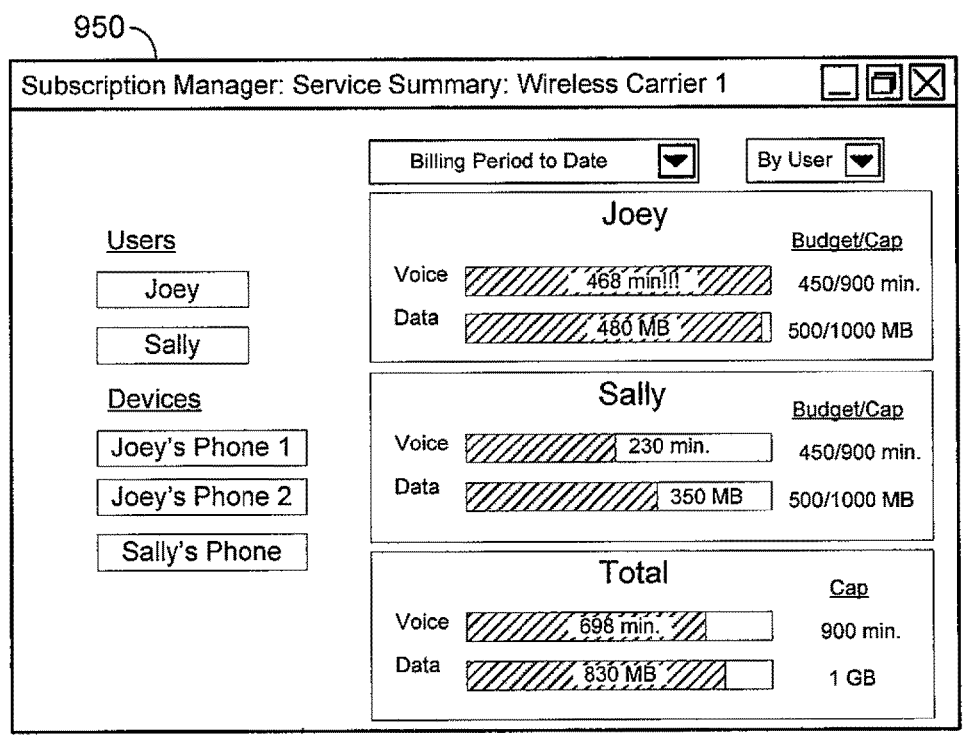

FIG. 9B shows a user interface 950 of the administrative tool for reviewing information about network resource use related to Wireless Service A. For this example, network resource usage information is presented by user in user interface 950. Note that user Joey has used more than his budget. This may be possible when the budget is not set as a hard limit.

Figure 10A:
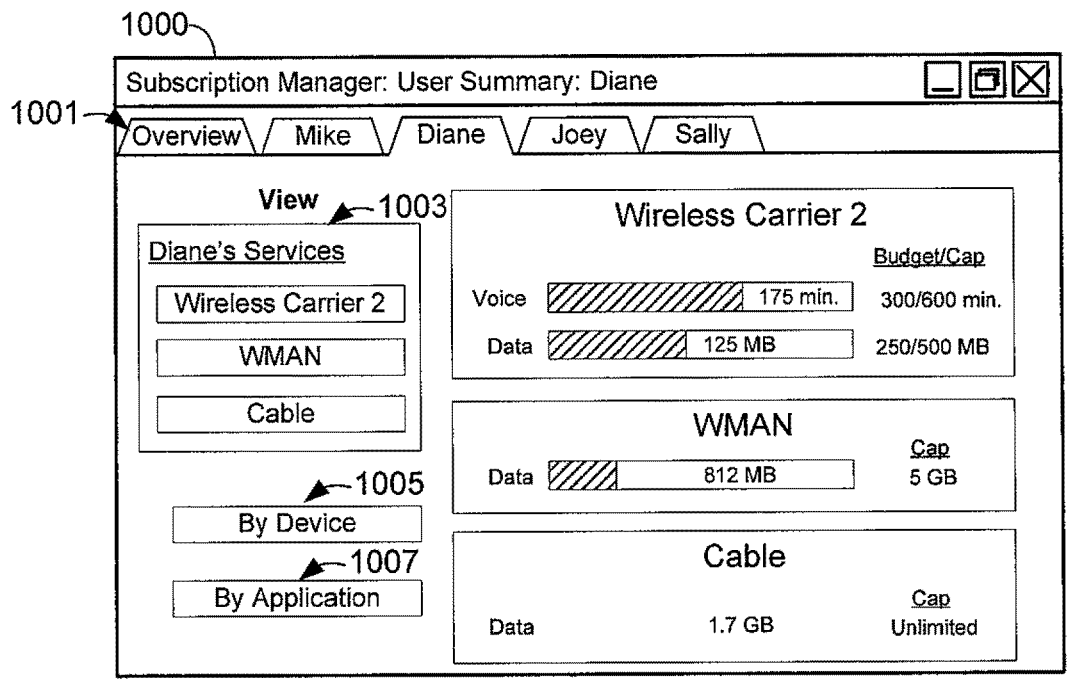

FIG. 10A shows a user interface 1000 of the administrative tool when, for example, the option for managing by user is selected (e.g., option 713, FIG. 7). In this example, user interface 100 provides a plurality of tabs 1001. For the purposes of illustration User Diane's tab is selected. The user's use of the network services' resources may be reviewed, for example, by service, device, or by application by selecting the service option 1003, the device option 1005, or the application option 1007, respectively. In this example, use is reviewed by service. A list of the user's services and an indication of how much of the resource has been consumed is provided. In some embodiments, a use budget of a network resource may be assigned to the user. Use of the network resource may be indicated relative to the budget, rather than the usage limit for the group of users. In some embodiments, a budget may not be defined, and a relative comparison may be made to the usage limit.

Figure 10B:
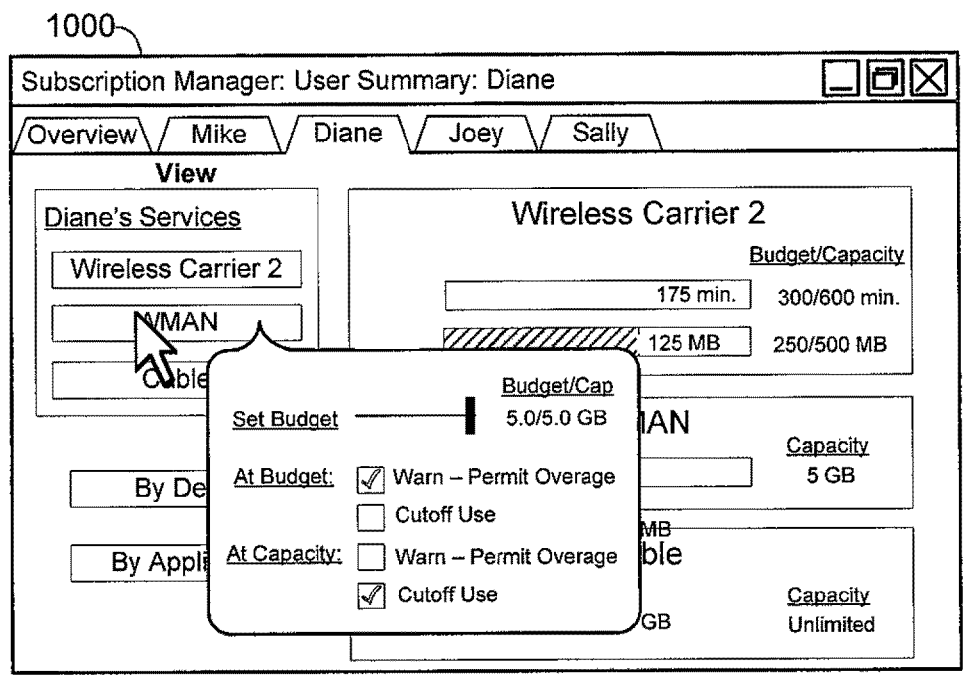

FIG. 10B shows user interface 1000 after selection of a network service from the list of network services according to some embodiments. A pop-up window may provide for setting a budget, and behavior when the budget is reached. Policy may also be set for what occurs when the usage limit of the network resource is reached.

Figure 11A:
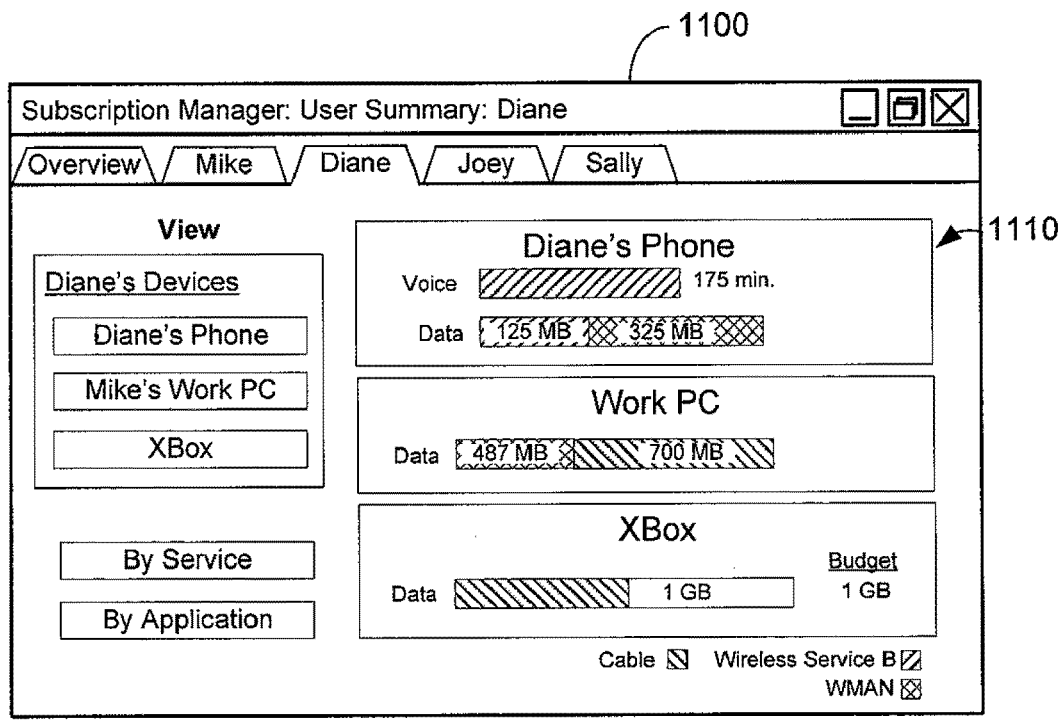

FIG. 11A shows a user interface 1100 for viewing a user's network use by device. Block 1110 provides a summary of a user's use of a phone. Note that network resources of the same type (e.g., data) may be displayed together or separately even if they are associated with different network services. For example, Diane's Phone may use the data network resource from both the Wireless Service B and from WMAN. The total use of data by the device may be shown together, or listed separately.

Figure 11B:
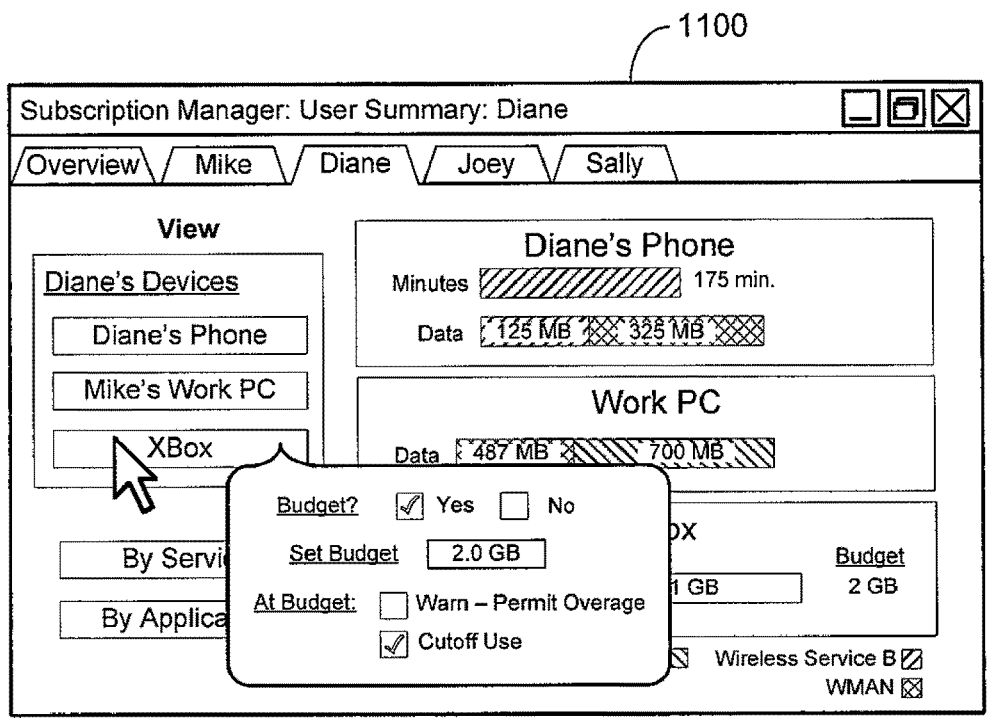

In some embodiments, devices may have separate budgets from users and/or devices. User interface 1100 as shown in FIG. 11B, for example, shows where the budget for the console system XBox is set. For example, when a user is playing a particular game (application) on the XBox console, network usage may count toward budgeted amounts for each of the user, application, and the console. It may be possible that an administrator sets budgets that are conflicting. That is, for one or more of the user budget, the device budget, and the application budget may permit continued usage while, at the same time, one or more of the same budgets may not permit further usage. If budgets are set that may be conflicting a policy may resolve which budgets should be enforced. For example, the policy may enforce each budget, taking action when the any of the budgeted limits are reached or give certain budgets priority over other budgets.

A user interface similar to user interface 1100 may be provided in response to user selection of the option for managing by device is selected (e.g., option 715, FIG. 7). For example, all devices may be listed, and information may be displayed for total device usage, usage per user, use per network service, and/or use per application.

Figure 12A:
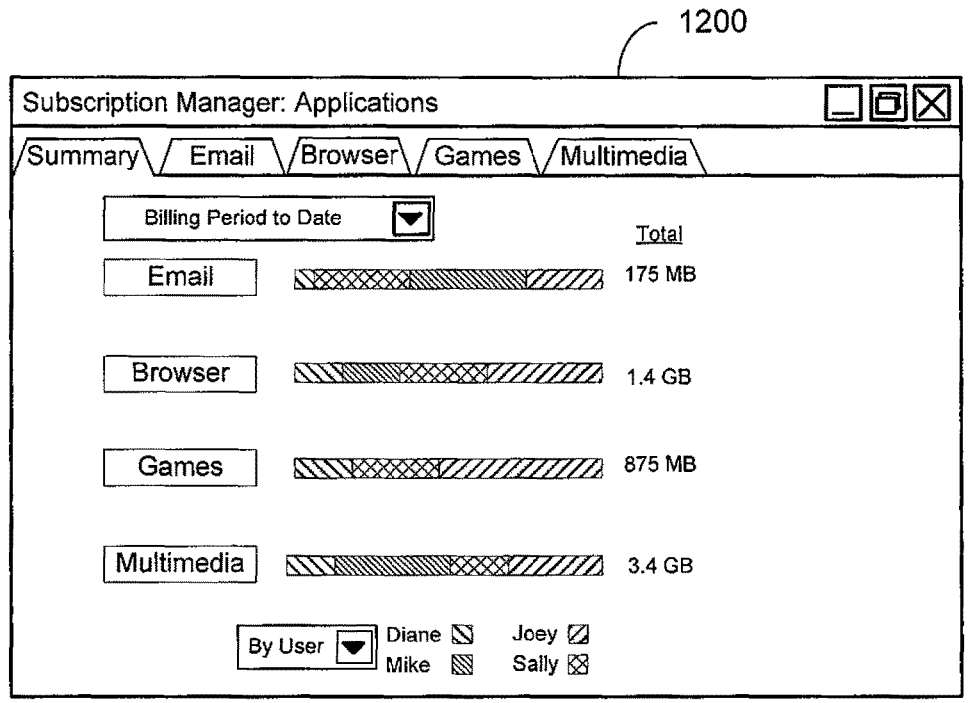

FIG. 12A shows a user interface 1200 of the administrative tool when, for example, the option for managing by application is selected (e.g., option 717, FIG. 7). In some embodiments, use of network resources for each application may be logged. In some embodiments, applications are grouped based on type and use of the network resource by an application type may be displayed. FIG. 12A shows use of network resources by four groups of applications: email, web browsers, games, and multimedia. For each application, usage may further be broken down by user, device, and/or network service. User interface 1200 shows the network resources used by each application type broken down by user.

Figure 12B:
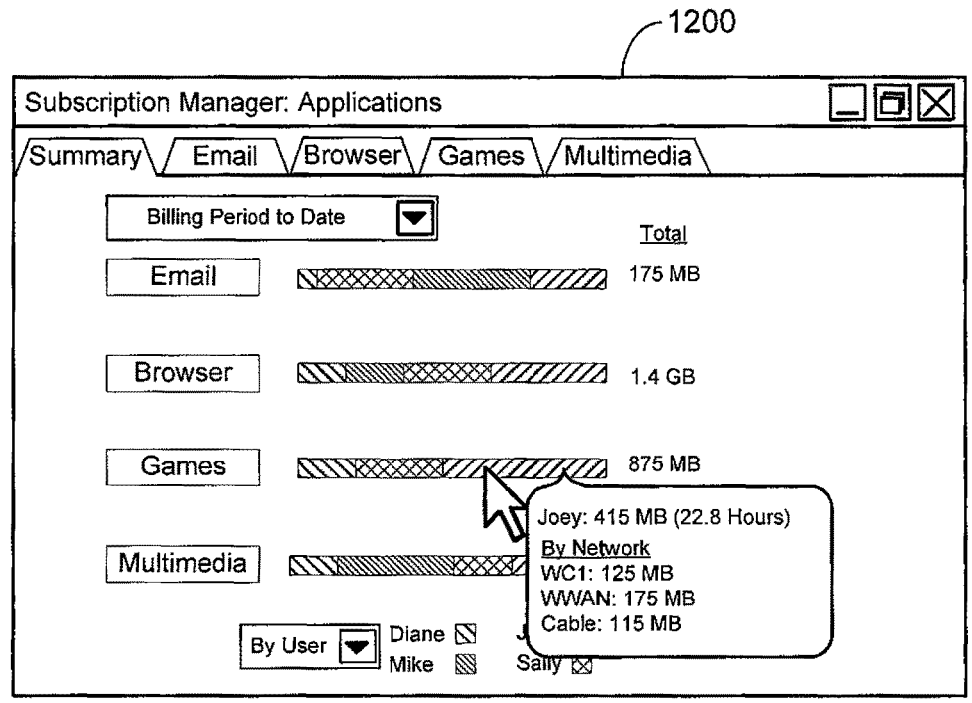

FIG. 12B shows user interface 1200 with a pop-up that may appear to further break down network usage. In the example shown, a cursor 1201 selects a network usage of games played by Joey. The pop-up may indicate, for example, the total amount of network resource used, the total amount of time over which the network resource was used, and by which networks the network resource was used on.

It should be appreciated that usage may be monitored and budgeted by an administrator in other suitable ways as well. For example, usage limits may be set for a voice user based on the call recipient, time of day, or any other suitable parameter. As another example, an administrator may limit the length of time for individual session, a frequency of sessions, or place a usage limit for a network resource during a period of time (e.g., limit of 2 hours of games per day). Further, usage limits may be set based on the type of usage, for example, multimedia downloads may be limited, but general web browsing may be unlimited.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone, a gaming console (e.g., Xbox), a digital video recorder (DVR), set-top boxes, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of managing a network resource, the method comprising acts of:
   connecting to a network providing the network resource;
   determining a budget for use of the network resource;
   determining an amount of the network resource already consumed;
   operating a network interface to transmit or receive content over the network;
   determining a rate of usage of the network resource; and
   estimating an amount of time until the amount of the network resource consumed reaches the budget, the estimating being based at least in part on the budget, the amount of the network resource already consumed and the rate of usage.

2. The method of claim 1, further comprising displaying an indicator of the amount of time until the amount of the network resource consumed reaches the budget.

3. The method of claim 2, wherein:
   the method is executed on a computing device having the network interface;
   the network interface is operated to receive the content, the content being streaming media; and
   the computing device is unable to determine a total size of the content.

4. The method of claim 1, further comprising reducing a quality of the content if a threshold on the budget is exceeded.

5. The method of claim 4, wherein the content is streaming media, and reducing the quality of the content comprises streaming the media at a lower bit rate.

6. The method of claim 1, further comprising, if a threshold on the budget is exceeded:
   output a prompt asking a user whether a quality of the content should be reduced;
   receiving a user input indicating the quality of the content should be reduced; and
   in response to receiving the user input, reducing the quality of the content.

7. The method of claim 1, wherein the method performs the acts of determining a rate of usage and estimating an amount of time in response to determining that the amount of the network resource already consumed exceeds a threshold.

8. The method of claim 1, further comprising:
   obtaining a usage limit on the network resource;
   receiving input assigning a budget of the network resource to each of a plurality of resource consumers; and
   receiving input specifying an operation to perform if the amount of the network resource consumed by one of the plurality of resource consumers meets or exceeds the resource consumer's respective budget.

9. The method of claim 8, wherein the network resource is data from a wireless service and the usage limit is an amount of said data.

10. The method of claim 8, further comprising displaying an indication of an amount of the network resource consumed by each of the plurality of the resource consumers.

11. The method of claim 8, wherein the resource consumer consists of at least one of a user, a device, and an application.

12. The method of claim 8, wherein the resource consumers are a first type of resource consumers, the method further comprising displaying an indication of an amount each of the first type of resource consumers consumed with a second type of resource consumer.

13. The method of claim 12, wherein the first type of resource consumer is a user, and the second type of resource consumer is a computing device, and the displaying comprises displaying an indication of an amount of the resource consumed with the computing device by each user.

14. An apparatus comprising at least one processor performing a method of managing a network resource, the method comprising acts of:
   connecting to a network providing the network resource;
   determining a budget for use of the network resource;
   determining an amount of the network resource already consumed;
   operating a network interface to transmit or receive content over the network;
   determining a rate of usage of the network resource; and
   estimating an amount of time until the amount of the network resource consumed reaches the budget, the estimating being based at least in part on the budget, the amount of the network resource already consumed and the rate of usage.

15. The apparatus of claim 14, wherein the method performed by the at least one processor further comprises displaying an indicator of the amount of time until the amount of the network resource consumed reaches the budget.

16. The apparatus of claim 14, wherein the method performed by the at least one processor
   the at least one processor comprises a network interface of a computing device;
   the network interface is operated to receive the content, the content being streaming media; and
   the computing device is unable to determine a total size of the content.

17. The apparatus of claim 14, wherein the method performed by the at least one processor further comprises reducing a quality of the content if a threshold on the budget is exceeded.

18. The apparatus of claim 17, wherein the content is streaming media, and reducing the quality of the content comprises streaming the media at a lower bit rate.

19. The apparatus of claim 14, wherein the method performed by the at least one processor, further comprises, if a threshold on the budget is exceeded:
   output a prompt asking a user whether a quality of the content should be reduced;
   receiving a user input indicating the quality of the content should be reduced; and
   in response to receiving the user input, reducing the quality of the content.

* * * * *